United States Patent [19]

Burkhart et al.

[11] Patent Number: 5,391,679
[45] Date of Patent: Feb. 21, 1995

[54] METHOD FOR THE SYNTHESIS OF POLYETHER SILOXANES

[75] Inventors: Georg Burkhart, Essen; Dietmar Schaefer, Hattingen; Andreas Weier, Essen; Dietmar Wewers, Bottrop, all of Germany

[73] Assignee: Th. Goldschmidt AG, Essen, Germany

[21] Appl. No.: 62,675

[22] Filed: May 17, 1993

[30] Foreign Application Priority Data

Jun. 11, 1992 [DE] Germany ............................ 4219070

[51] Int. Cl.$^6$ ............................................. C08G 77/08
[52] U.S. Cl. .......................................... 528/27; 528/13; 528/16; 528/18; 528/14; 556/445; 525/479; 525/474; 568/620
[58] Field of Search ..................... 528/27, 13, 16, 18, 528/14; 556/445; 525/479, 474; 568/620

[56] References Cited

U.S. PATENT DOCUMENTS

| | | | |
|---|---|---|---|
| 2,293,868 | 8/1942 | Toussaint | 568/620 |
| 2,538,072 | 1/1951 | Zech | 549/521 |
| 2,846,458 | 8/1958 | Haluska | 528/27 |
| 3,057,901 | 10/1962 | Plueddemann | 556/445 |
| 4,665,239 | 5/1987 | Panek et al. | 568/624 |

OTHER PUBLICATIONS

*Handbook of Epoxy Resins*, Lee and Neville; 1982, pp. 2–16.

*Primary Examiner*—John C. Bleutge
*Assistant Examiner*—Margaret W. Glass
*Attorney, Agent, or Firm*—Anderson Kill Olick & Oshinsky

[57] ABSTRACT

Polyether siloxanes, which are linked to the polysiloxane backbone through Si—C bonds, are synthesized by reacting given polysiloxanes with a compound having at least one epoxide group in such amounts, that there are at least two epoxide groups per OH group, in the presence of Lewis acids at temperatures not exceeding 60° C. or in the presence of complex catalysts, which accelerate the addition between epoxide groups and hydroxyl groups, at temperatures up to 140° C., the reaction optionally being carried out in the presence of an inert solvent. The polyether siloxanes obtained have a defined functionality and are free of excess, unreacted polyol components.

10 Claims, No Drawings

METHOD FOR THE SYNTHESIS OF POLYETHER SILOXANES

FIELD OF THE INVENTION

The invention relates to a method for the synthesis of polyether siloxanes, which are free of excess polyethers and the polyether groups of which are linked to the polysiloxane backbone through Si—C bonds.

BACKGROUND INFORMATION AND PRIOR ART

The synthesis of polyether siloxanes by reacting chloropolysiloxanes with polyether diols requires an excess of polyether diols, measured by the molar ratio of OH groups to SiCl groups, in order to avoid the formation of $A[BA]_x$ polymers or cross-linked polymers. In most cases, however, it is not possible to remove the excess polyether diol from the reaction mixture. Removal by distillation generally fails due to the high molecular weight of the polyether diol and the physical properties of the diol caused by this high molecular weight. Selective removal of polyether diol by washing is economically unfeasible and frequently not possible due to the surfactant properties of the polyether siloxane.

For the addition reaction between a polyether and an olefinic double bond, such as allyl polyether, and hydrogensiloxanes, it is also necessary to use an excess of polyether, since a portion of the polyether is not available for the addition reaction due to isomerization. The addition reaction proceeds quantitatively with respect to the SiH groups within an economically justifiable time only in the presence of excess amounts of polyether. The problem of removing the isomerized or excess unreacted amounts of allyl polyether also exists in such a procedure.

OBJECTS OF THE INVENTION

An object of the present invention is to synthesize polyether siloxanes of defined functionality in as pure a form as possible, that is, free of excess, unreacted polyol components.

SUMMARY OF THE INVENTION

The inventive method, which is characterized in that polysiloxanes of the general, average formula

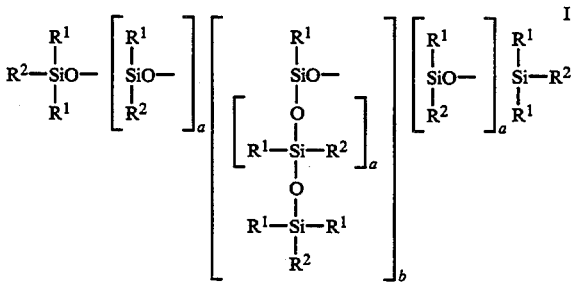

in which the
R$^1$ groups are the same or different and represent alkyl groups with 1 to 4 carbon atoms or phenyl groups, with the proviso that at least 90% of the R$^1$ groups are methyl groups;
R$^2$ groups can have the same meaning as the R$^1$ groups, with the proviso that at least one R$^2$ group is a group of the general formula

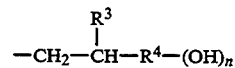

in which
R$^3$ is a hydrogen group or an alkyl group with 1 to 4 carbon atoms;
R$^4$ is an (n+1)-valent aliphatic hydrocarbon group or ether group; and
n has a value of 1, 2 or 3;
a has a value of 1 to 1000; and
b a value of 0 to 10;
are reacted with a compound having at least one epoxide group in such an amount that there are at least two epoxide groups per OH group, in the presence of a Lewis acid at a temperature not exceeding 60° C. or in the presence of complex catalysts, which accelerate the addition between epoxide groups and hydroxyl groups, at a temperature up to 140° C., the reaction optionally being carried out in the presence of an inert solvent.

In Formula I, the R$^1$ groups may or may not be the same. They are alkyl groups with 1 to 4 carbon atoms or phenyl groups. However, it is also necessary to fulfill the condition that at least 90% of the R$^1$ groups are methyl groups.

The R$^2$ groups can also be the same or different within the polymeric molecule and assume the meaning of the R$^1$ groups. However, at least one R$^2$ group must be a group of the general Formula II

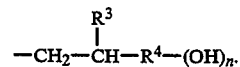

In this Formula II, R$^3$ represents a hydrogen or alkyl group with 1 to 4 carbon atoms. Preferably R$^3$ is a hydrogen group. R$^4$ is a bridge element which connects the carbon of the CHR$^3$ group with one or more OH groups. R$^4$ thus is an (n+1)-valent aliphatic hydrocarbon group, the carbon chain of which can be interrupted by an oxygen atom and then assume the meaning of an ether group. The value of n is 1, 2 or 3.

The R$^2$ group preferably is a group having the formula —(CH$_2$)$_x$—OH, in which x has a value of 2 to 6. Particularly preferred as R$^2$ groups are the —(CH$_2$)$_3$—OH and —(CH$_2$)$_3$—O—C$_2$H$_4$OH groups.

The subscript "a" characterizes the content of difunctional R$^1$—Si(O—)—R$^1$ and R—Si(O—)—R$^2$ and has a value of 1 to 1000. The number of units with a trifunctional siloxy unit is characterized by b, which has a value of 0 to 10.

It thus follows that when b=0, the average molecule has at least 4 silicon atoms. It should be taken into consideration that this formula is a general, average formula, which characterizes the average structure and composition of the polyether siloxane.

For the inventive method, a polysiloxane of Formula I is reacted with a compound, which has at least one epoxide group, with the proviso that there must be at least 2 epoxide groups for each OH group of Formula II.

As compounds with epoxide groups, ethylene oxide, propylene oxide and butylene oxide can be utilized. These can enter into addition reaction with the OH group of the R$^2$ group by themselves or in the form of a mixture or blockwise. Of these epoxides, ethylene oxide and propylene oxide are preferred.

Further suitable and advantageously usable epoxides are the cycloaliphatic epoxides. Examples of suitable, cycloaliphatic epoxides are cyclohexene oxide, vinylcyclohexene oxide, limonene oxide, cyclopentene oxide and cyclododecene oxide, vinylcyclohexene oxide and limonene oxide being particularly preferred.

A particular advantage of the inventive method consists therein that epoxy alkenes or epoxy alkene ethers can be used as epoxides. The addition reaction of these epoxy compounds results in polyether siloxanes, which have olefinic double bonds in the laterally linked polyether chain. By using an epoxy alkene of the general formula

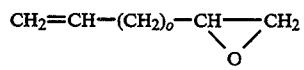

polysiloxanes are obtained, which have, for example, the following polyether grouping at one or more silicon atoms.

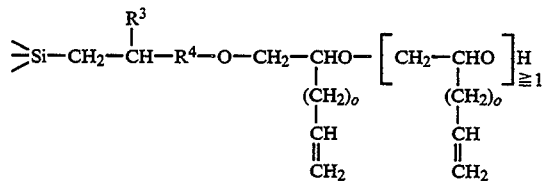

Compounds of this type could not be synthesized by previously known methods. They have a great advantage in that, because of the olefinic double bond, they are accessible for further reactions. For example, it is possible to copolymerize such polyether siloxanes with vinyl or (meth)acrylate monomers. They can also be used to modify epoxides.

Instead of the epoxy alkenes, it is also possible to use epoxy alkene ethers of the general formula

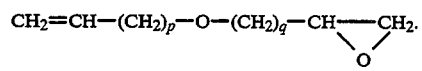

In this formula, p is a number from 0 to 4 and q is a number from 1 to 4. The allyl glycidyl ether is a preferred example of an epoxy alkene ether.

Polysiloxanes of Formula I are reacted with compounds of epoxide groups in the presence of catalysts. Lewis acids as well as complex catalysts can be used as catalysts. If Lewis acids are used, the temperature should not exceed 60° C., since splitting and equilibration reactions at the polysiloxane backbone become noticeable to an interfering extent at higher temperatures.

An example of a suitable Lewis acid is $BF_3$. Further suitable Lewis acids are $AlCl_3$, $SnCl_4$ and bis(1-methoxy-2-propoxy) zinc.

As complex catalysts, double metal complex catalysts with cyano ligands are preferably used. Examples of such catalysts are $Zn_3[Co(CN)_6]_2$, $Zn_3[Ir(CN)_6]_2$, and $Fe_3[Co(CN)_6]_2$.

It may furthermore be of advantage to carry out the reaction in the presence of a solvent. The solvent must, however, be inert towards the reactants. If Lewis acids and, in particular, $BF_3$ is used, tetrahydrofuran is unsuitable as a solvent, since it is split and incorporated in considerable amounts in the polyether group. Suitable solvents are, for example, dimethoxyethane, toluene, and diethylene glycol dimethyl ether.

The polyether siloxanes, synthesized by the inventive method, can be used for the same purposes as the polyether siloxanes known from the state of the art. A preferred application is the use of these compounds as stabilizers in polyurethane foaming. Due to their method of synthesis, however, the compounds have the advantage that they are free of unreacted polyether monools or diols, which would react with isocyanates, for example, during the preparation of polyurethane foams. As stated above, the polyether siloxanes, which still have at least one olefinic double bond in the polyether group, are suitable as macromonomers and are compounds which can undergo a copolymerization reaction. They can therefore be used to modify polymers. It is furthermore possible to carry out other reactions with the olefinic double bond such as an addition reaction. An example of such a reaction is the one with sodium hydrogen sulfite.

In the following examples, the method is explained in greater detail, it being understood that the examples are given by way of illustration and not by way of limitation. Furthermore, the properties of the compounds obtained are shown.

EXAMPLE 1

To a mixture of 92.6 g (0.1 mole) of a siloxane of the average formula

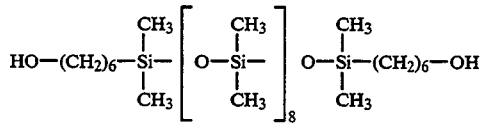

which contains hydroxy groups linked over Si—C groups, and 20 mL of toluene, 0.5 mL of boron trifluoride is added as a 48% mixture in diethyl ether. Propylene oxide (46.4 g, 0.8 mole) is then slowly added dropwise so that the temperature of the reaction mixture does not exceed 60° C. At the end of the addition, stirring is continued for another half-hour and the mixture is neutralized with water and sodium hydrogen carbonate. Filtration and removal of the volatile reaction products at 120° C./0.1 torr result in 133 g (96% of the theoretical amount) of a moderately viscous oil, which is, according to spectroscopic data, a silicone polyether of the average formula

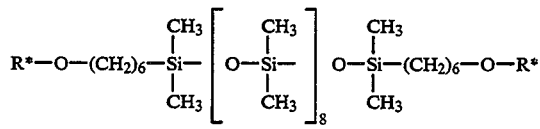

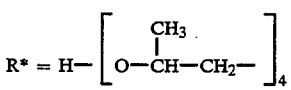

EXAMPLE 2

To a mixture of 92.6 g (0.1 mole) of a siloxane of the average formula

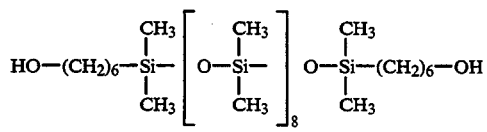

which contains hydroxy groups linked over Si—C groups, and 20 mL of toluene, 0.5 mL of boron trifluoride is added as a 48% mixture in diethyl ether. Allyl glycidyl ether (91.2 g, 0.8 mole) is then slowly added dropwise, so that the temperature of the reaction mixture does not exceed 60° C. At the end of the addition, stirring is continued for another half-hour and the mixture is neutralized with water and sodium hydrogen carbonate. Filtration and removal of the volatile reaction products at 120° C./0.1 torr result in 171 g (93% of the theoretical amount) of a moderately viscous oil, which is, according to spectroscopic data, a silicone polyether of the average formula

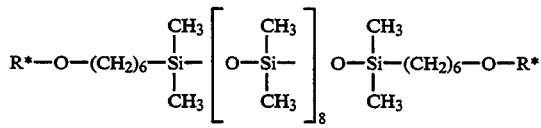

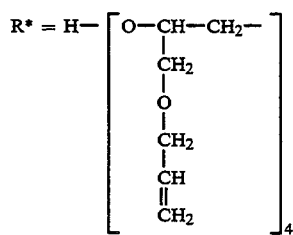

EXAMPLE 3

To a mixture of 92.6 g (0.1 mole) of a siloxane of the average formula

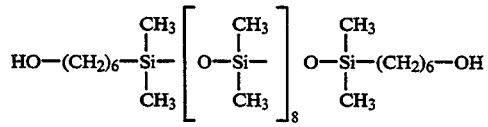

which contains hydroxy groups linked over Si—C groups, and 20 mL of toluene, 0.5 mL of boron trifluoride is added as a 48% mixture in diethyl ether. Propylene oxide (116 g, 2.0 moles) and 88 g (2.0 moles) of ethylene oxide are then slowly added dropwise as a mixture, so that the temperature of the reaction mixture does not exceed 60° C. At the end of the addition, stirring is continued for another half-hour and the mixture is neutralized with water and sodium hydrogen carbonate. Filtration and removal of the volatile reaction products at 120° C./0.1 torr result in 282 g (95% of the theoretical amount) of a moderately viscous oil, which is, according to spectroscopic data, a silicone polyether of the average formula

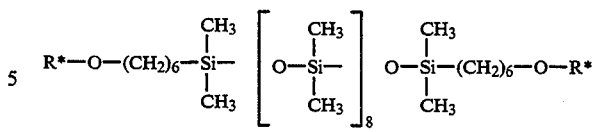

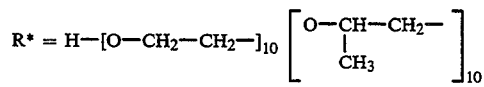

EXAMPLE 4

To a mixture of 92.6 g (0.1 mole) of a siloxane of the average formula

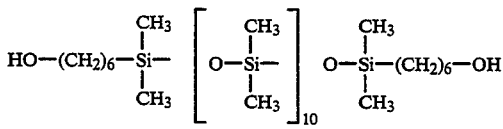

which contains hydroxy groups linked over Si—C groups, and 20 mL of toluene, 0.5 mL of boron trifluoride is added as a 48% mixture in diethyl ether. Vinylcyclohexene oxide (124 g, 1.0 mole) is then slowly added dropwise, so that the temperature of the reaction mixture does not exceed 60° C. At the end of the addition, stirring is continued for another half-hour and the mixture is neutralized with water and sodium hydrogen carbonate. Filtration and removal of the volatile reaction products at 120° C./0.1 torr result in 210 g (97% of the theoretical amount) of a moderately viscous oil, which is, according to spectroscopic data, a silicone polyether of the average formula

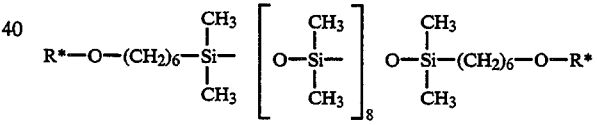

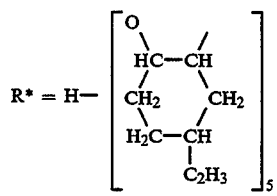

EXAMPLE 5

To a mixture of 84.2 g (0.1 mole) of a siloxane of the average formula

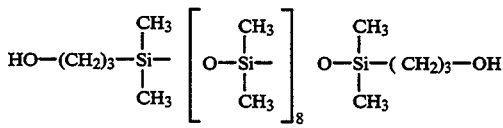

which contains hydroxy groups linked over Si—C groups, and 20 mL of toluene, 0.5 mL of boron trifluoride is added as a 48% mixture in diethyl ether. Limonene oxide (121.8 g, 0.8 mole) is then slowly added dropwise, so that the temperature of the reaction mixture does not exceed 60° C. At the end of the addition, stirring is continued for another half-hour and the mixture is neutralized with water and sodium hydrogen carbonate. Filtration and removal of the volatile reaction products at 120° C./0.1 torr result in 190 g (92% of the theoretical amount) of a moderately viscous oil, which is, according to spectroscopic data, a silicone polyether of the average formula which contains hydroxy groups linked over Si—C groups, 40 mL of dimethoxyethane and 0.1 g of zinc hexocyanocobaltate complex, 290 g (5.0 moles) of propylene oxide is added dropwise in a pressure vessel at 120° C. At the end of the reaction, a further 228 g (2.0 moles) of allyl glycidyl ether is added. Stirring is then continued for another hour at 130° C. Filtration and removal of the volatile reaction products at 120° C./0.1 torr yield 686 g (91% of the theoretical amount) of an oil which, according to spectroscopic data, is a silicone polyether of the average formula

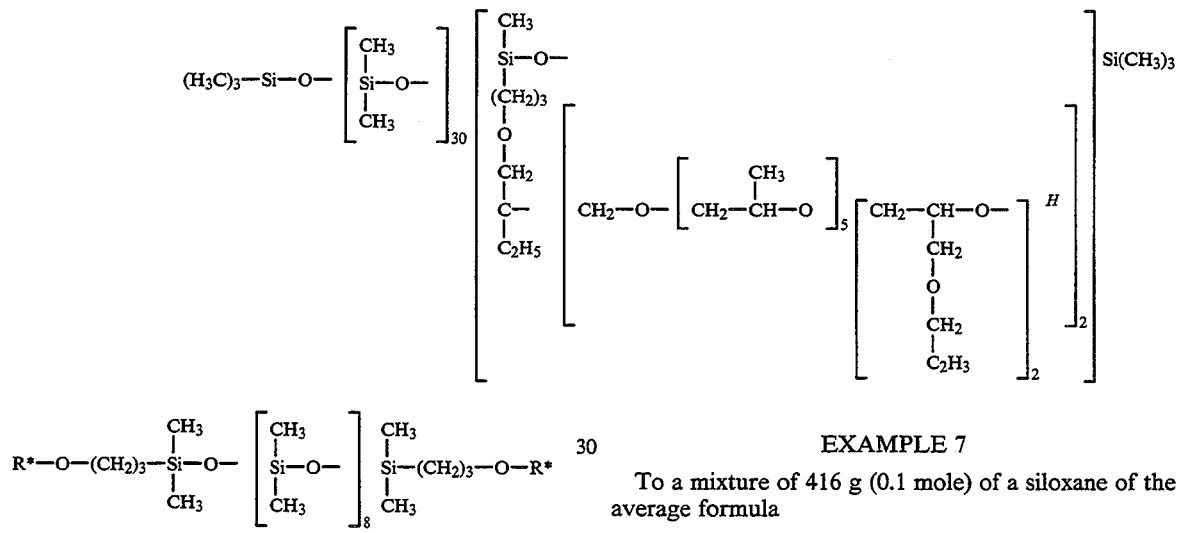

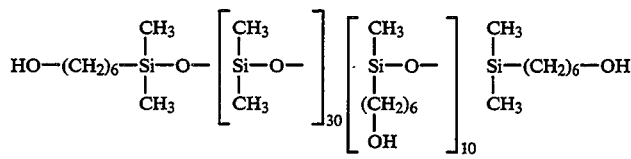

EXAMPLE 7

To a mixture of 416 g (0.1 mole) of a siloxane of the average formula

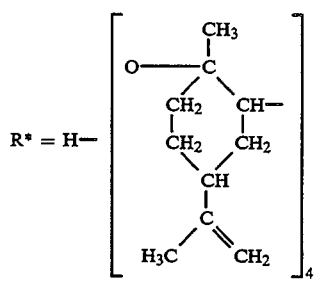

containing hydroxy groups linked over Si—C groups, and 100 mL of toluene, and 1 mL of toluene, 1 mL of boron trifluoride is added as a 48% mixture. Vinylcyclohexene oxide (446.4 g, 3.6 moles) is then slowly added dropwise so that the temperature of the reaction mixture does not exceed 60° C. At the end of the addition, stirring is continued for another half-hour and the reaction mixture is neutralized with water and sodium hydrogen carbonate. Filtration and removal of the volatile reaction products at 120° C./0.1 torr yield 810 g (94% of the theoretical amount) of a moderately viscous oil which, according to spectroscopic data, is a silicone polyether of the average formula

EXAMPLE 6

To a mixture of 236 g (0.05 mole) of a siloxane of the average formula

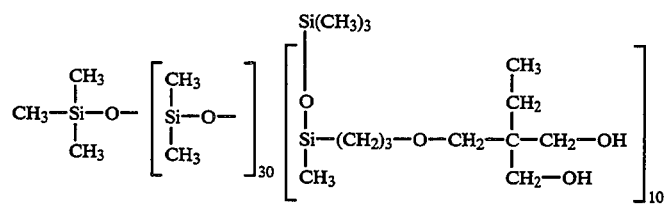

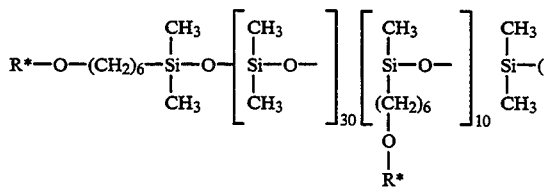

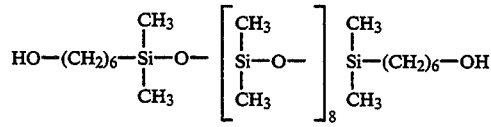

EXAMPLE 8

To a mixture of 92.6 g (0.1 mole) of a siloxane of the average formula

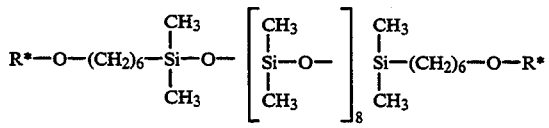

which contains hydroxy groups linked over Si—C groups, and 20 mL of toluene, 0.5 mL of boron trifluoride is added as a 48% mixture in diethyl ether. A mixture of 152 g limonene oxide (1.0 mole) and 120 g (0.5 mole) of 1,2-hexadecene oxide is then slowly added dropwise so that the temperature of the reaction mixture does not exceed 60° C. At the end of the addition, stirring is continued for another half-hour and the mixture is neutralized with water and sodium hydrogen carbonate. Filtration and removal of the volatile reaction products at 120° C./0.1 torr result in 365 g (97%) of an oil, which is, according to spectroscopic data, a silicone polyether of the average formula

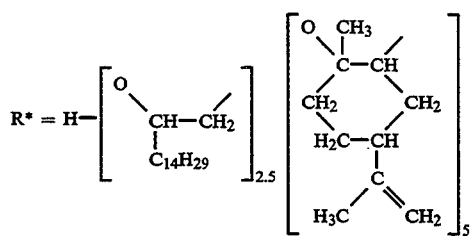

APPLICATION TESTS

To test the application, the inventive silicone polyethers obtained are mixed at a concentration of 1% into a self-curing lacquer system and the mixture is applied with a 40 μm doctor blade onto bonderized sheet metal. After a curing time of 48 hours, the lacquer is tested by a pull-off test with Tesa$^R$ 4154 for its release behavior (Test 1).

The tensile force required to pull a 500 g weight resting on three screws over the lacquer at 30 cm/min is a measure of the scratch resistance of the lacquer obtained (Test 2).

The foam stabilizing properties of the resulting silicone polyethers are tested in a flexible foam formulation with 100 parts of a polyether polyol, 4.0 parts of water, 0.1 part of a tertiary amine catalyst, 0.1 part of tin octoate and 0.5 part of a foam stabilizer. For this purpose, 0.5 part of the substance to be tested is mixed with the formulation and the height, to which the foam rises, is measured (Test 3).

|  | Test 1 | Test 2 | Test 3 |
|---|---|---|---|
| No Addition | 11.6 N | 3.5 N | 31.1 cm |
| Substance from Example 1 | 6.4 N | 1.8 N | Collapse |
| Substance from Example 2 | 7.1 N | 2.3 N | Collapse |
| Substance from Example 3 | 6.2 N | 1.6 N | 23.2 cm |
| Substance from Example 4 | 5.9 N | 1.9 N | Collapse |
| Substance from Example 5 | 5.9 N | 2.1 N | Collapse |
| Substance from Example 6 | 9.7 N | 3.2 N | 32.6 cm |
| Substance from Example 7 | 8.5 N | 2.7 N | 31.7 cm |
| Substance from Example 8 | 5.1 N | 1.4 N | Collapse |

We claim:

1. A method for synthesis of polyether siloxane containing no free excess polyether and having polyether group linked to a polysiloxane backbone through Si—C bonds, comprising the steps of reacting polysiloxane of a general, average formula

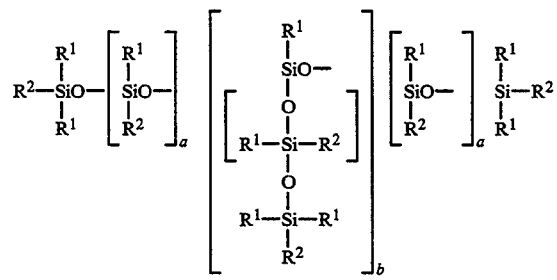

in which $R^1$ groups are same or different and represent alkyl groups with 1 to 4 carbon atoms or phenyl groups, with the proviso that at least 90% of the $R^1$ groups are methyl groups;

$R^2$ groups can have the same meaning as the $R^1$ groups, with the proviso that at least one $R^2$ group is a group of the general formula

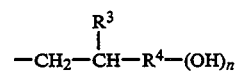

in which $R^3$ is a hydrogen group or an alkyl group with 1 to 4 carbon atoms;

$R^4$ is an (n+1)-valent aliphatic hydrocarbon group or ether group; and n has a value of 1, 2 or 3;

a has a value of 1 to 1000; and b a value of 0 to 10;

with a compound having at least one epoxide group in an amount, so that there are at least two epoxide groups per OH group, in presence of a Lewis acid at a temperature not exceeding 60° C. or in presence of a complex catalyst capable of accelerating the addition between epoxide and hydroxyl groups at a temperature of up to 140° C., the reaction optionally being carried out in presence of an inert solvent.

2. The method of claim 1, further comprising that at least one $R^2$ group is a —$(CH_2)_3$—OH group.

3. The method of claim 1, further comprising that at least one $R^2$ group is a —$(CH_2)_3$—O—$C_2H_4OH$ group.

4. The method of claim 1, further comprising that the epoxide is an alkylene oxide with 2 to 4 carbon atoms.

5. The method of claim 1, further comprising that the epoxide is an cycloaliphatic epoxide.

6. The method of claim 1, further comprising that the epoxide is an epoxyalkene of the general formula

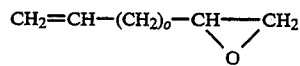

wherein o is a number from 0 to 8.

7. The method of claim 1, further comprising that the epoxide is an epoxyalkene ether of the general formula

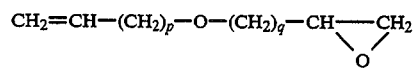

wherein p is a number from 0 to 4 and q a number from 1 to 4.

8. The method of claim 7, further comprising that the epoxyalkene ether is allyl glycidyl ether.

9. The method of claim 1 further comprising that the Lewis acid is $BF_3$.

10. The method of claim 1 comprising that the complex catalyst is a double metal complex catalyst with cyano ligands.

* * * * *